Patented Nov. 15, 1949

2,488,081

UNITED STATES PATENT OFFICE 2,488,081

PRODUCTION OF 2(PARA-AMINOBENZENE-SULFONAMIDO)-4-METHYLPYRIMIDINE

Maurice Louis Auguste Fluchaire and Serge Javorsky, Lyon, France, assignors to Societe Des Usines Chimiques Rhone Poulenc, Paris, France, a French company No Drawing. Application June 25, 1945, Serial No. 601,552. In France May 22, 1944

Section 1, Public Law 690, August 8, 1946
Patent expires May 22, 1964

7 Claims. (Cl. 260—239.6)

This invention relates to the preparation of a therapeutically useful heterocyclic compound, 2(p-aminobenzene-sulphonamido)-4-methyl-pyrimidine.

It is well known that 2(p-aminobenzene-sulphonamido)-pyrimidine and its substitution products can be prepared by the interaction of reactive derivatives of benzene sulphonic acid, appropriately substituted in the para-position, and amino pyrimidines which can themselves be prepared, following known procedure, by condensing guanidines or their salts with carbonyl compounds of general formula:

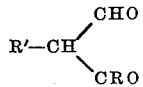

(in which R represents a hydrogen atom or a substituted or unsubstituted hydrocarbon radical, and R¹ represents a hydrogen atom or a substituted or unsubstituted hydrocarbon radical, or a halogen atom) or alternatively with derivatives of these carbonyl compounds in which the carbonyl groups are replaced partly or completely from the point of view of function, by substituents (precursors) from which the carbonyl groups are regenerated in their free or enolic or hydrated forms under the conditions of the reaction.

With the same end in view, it has also been proposed to cause benzenesulphonyl guanidines, substituted in the para-position by an amino group or by a substituent capable of being converted into an amino group, to react with either compounds containing the grouping

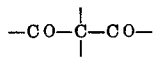

their tautomers, or derivatives, or with a monoderivative of malonic di-aldehyde, for example the diethylacetal of β-ethoxy acrolein.

It has been suggested that it might be possible mutatis mutandis to employ the diverse variants heretofore described for use in the preparation of aminopyrimidine in the direct synthesis of sulphonamido pyrimidines. Experiments made along these lines by the present applicants have shown that such an extension is not justified. Indeed, with many compounds which condense with guanidines to give aminopyrimidines in good yield, if the guanidine is replaced by p-acetyl-aminobenzenesulphonyl guanidine, other conditions remaining the same, the anticipated product, p-acetylaminobenzenesulphonyl pyrimidine, is not obtained. This is the case, for example, with 1:1:3:3-tetrachloropropane, 1:2:3-trichloropropene-1 and with 1:2:3:3-tetrachloro-propene-1. Again, the diethylacetal of β-ethoxy acrolein condensed in sulphuric acid solution with guanidine sulphate, gives a very good yield of 2-amino pyrimidine but, under the same conditions, does not react with p-acetylaminobenzenesulphonyl guanidine.

In contra-distinction, it has now been found that it is possible to prepare 2(p-aminobenzenesulphonamido)-4-methyl-pyrimidine in very good yield by condensing benzenesulphonyl guanidines, substituted in the para position by a member of the class consisting of amino groups and groups capable of conversion into an amino group, with a member of the class consisting of 1-halogeno-1-butene-3-ones, their acetals, and the derivatives of their enolic forms, the condensation being followed, if necessary, by the conversion of the para-substituent into an amino group. Examples of substituents capable of being converted into an amino group are acylamino, alkylideneamino, nitro, nitroso, azo, azido and carbamido groups.

The condensation can be carried out in the presence or absence of a solvent, but preferably in the presence of a condensing agent such as a metal, an alkali alcoholate, mineral acid, acid anhydride, nitrogen base or other analogous agent.

The following, non-limitative examples illustrate the process of the present invention: parts indicated are parts by weight.

Example I 7 parts of sodium are dissolved in 200 parts of ethyl alcohol and 25.6 parts of p-acetylaminobenzenesulphonyl guanidine and 10.4 parts of 1-chloro-1-butene-3-one are added.

The mixture is boiled under reflux for five hours. The ethyl alcohol is distilled off and the residue taken up in 200 parts of water, filtered to eliminate a small amount of insoluble product and the filtrate neutralised with acetic acid. 2(p-acetylaminobenzenesulphonamido)-4-methyl-pyrimidine is precipitated. By deacetylation, 2(p-aminobenzenesulphonamido)4-methyl pyrimidine (M. P. 235° C.) is obtained.

Example II

A mixture of 25.6 parts of p-acetylaminobenzenesulphonyl guanidine and 180 parts of pyridine is boiled under reflux. In the course of one hour, 10.5 parts of chloro-butenone are added and the mixture refluxed for a further four hours. Pyridine is then distilled off under vacuum. The residue is taken up in 2N aqueous soda, a small amount of p-acetylaminobenzene-sulphonyl guanidine which has not reacted is filtered off and the alkaline filtrate is refluxed for one hour. The mixture is then cooled and 2(p-aminobenzenesulphonamido)-4-methyl-pyrimidine is precipitated by means of acetic acid. On recrystallisation from ethyl alcohol it melted at 235° C.

*Example III*

7 parts of sodium are dissolved in 200 parts of benzyl alcohol and cooled to +5° C. whereupon 10.5 parts of chlorobutenone and 25.6 parts of p-acetylaminobenzenesulphonyl guanidine are then added. The mixture is warmed and refluxed for four hours at a temperature of about 150° C. After cooling, the mixture is poured into 200 parts of water and filtered from a small amount of unreacted p-acetylaminobenzenesulphonyl guanidine. In the filtrate, an aqueous alkaline layer separates. This layer is neutralized just to the turning point of litmus. 2(p-acetylaminobenzenesulphonamido) - 4 - methyl - pyrimidine is thereby precipitated. It is deacetylated as in Example I.

*Example IV*

7 parts of sodium are dissolved in 200 parts of absolute ethyl alcohol, contained in an apparatus fitted with stirrer, 21.4 parts of p-aminobenzenesulphonyl guanidine (melting at 185° C.) are added with stirring and the mixture heated under reflux. In the course of one hour, 10.5 parts of chlorobutenone are poured into the mixture and heating under reflux continued for a further four hours. Alcohol is distilled off on the water bath and the mixture filtered in order to separate a small amount of unreacted p-aminobenzenesulphonyl guanidine. The filtrate is acidified with acetic acid and 2(p-aminobenzenesulphonamido)-4-methyl pyrimidine thereby precipitated.

We claim:

1. A process for the preparation of 2(para-aminobenzenesulphonamido)-4-methyl pyrimidine which comprises reacting a para-acylaminobenzene sulphonyl guanidine with 1-chloro-1-butene-3-one, and then subjecting the resulting reaction product to a deacylation treatment.

2. A process of making 2(para-aminobenzenesulphonamido)-4-methyl pyrimidine which comprises reacting an acylaminobenzenesulphonyl guanidine with 1-chloro-1-butene-one in a non-aqueous inert organic solvent and subjecting the resulting reaction product to a deacylation treatment.

3. A process of making 2(para-aminobenzenesulphonamido)-4-methyl pyrimidine which comprises reacting para-acetylaminobenzenesulphonyl guanidine with 1-chloro-1-butene-3-one in a pyridine reaction medium and then subjecting the resulting reaction product to a deacylation treatment.

4. A process as claimed in claim 1 wherein the reaction is effected in the presence of a condensing agent consisting of an alkali alcoholate.

5. A process of making 2(para-aminobenzenesulphonamido)-4-methyl pyrimidine which comprises reacting para-aminobenzenesulphonyl guanidine with 1-chloro-1-butene-one in an alkali metal alcoholate reaction medium and separating the resulting reaction product.

6. A process for the production of 2(para-aminobenzene-sulphonamido)-4 - methylpyrimidine which comprises reacting benzenesulphonyl guanidine containing, in the para-position, a member of the class consisting of an amino group, an acylamino group convertible to an amino group by hydrolysis, a nitro group convertible by reduction, an azo group convertible by reduction, a carbamido group convertible by hydrolysis, a nitroso group convertible by reduction and an azido group convertible by reduction, with a 1-chloro-1-butene-3-one, and where the para-substituent in the product is not an amino group converting it into an amino group.

7. A process as claimed in claim 6, wherein the reaction is effected in the presence of an alkali metal alcoholate as condensing agent.

MAURICE LOUIS AUGUSTE FLUCHAIRE.
SERGE JAVORSKY.

REFERENCES CITED

The following references are of record in the file of this patent:

UNITED STATES PATENTS

| Number | Name | Date |
|---|---|---|
| 2,435,002 | Hartmann et al. | Jan. 27, 1948 |

FOREIGN PATENTS

| Number | Country | Date |
|---|---|---|
| 119,589 | Australia | Feb. 10, 1943 |

OTHER REFERENCES

Johnson et al., Chem. Rev., vol. 13, page 213 (1933). Caldwell et al., J. Am. Chem. Soc., vol. 63, pp. 2188-2190 (1941). Ganapathi, Proc. Indian Acad. Sci., vol. 16-A, pp. 115-125 (Aug. 1942).